(12) United States Patent
Mager et al.

(10) Patent No.: US 11,103,108 B2
(45) Date of Patent: Aug. 31, 2021

(54) SYSTEM, METHOD AND APPARATUS FOR SHAKER BOTTLE

(71) Applicant: Bolde Lifestyle LLC, Sacramento, CA (US)

(72) Inventors: Jacob Mager, Sacramento, CA (US); John A. Pennington, Sacramento, CA (US); Philip Powers, Denver, CO (US)

(73) Assignee: Bolde Lifestyle, LLC, Sacramento, CA (US)

( * ) Notice: Subject to any disclaimer, the term of this patent is extended or adjusted under 35 U.S.C. 154(b) by 0 days.

(21) Appl. No.: 16/996,274

(22) Filed: Aug. 18, 2020

(65) Prior Publication Data

US 2020/0375404 A1 Dec. 3, 2020

Related U.S. Application Data

(60) Provisional application No. 62/890,332, filed on Aug. 22, 2019.

(51) Int. Cl.
*A47J 43/27* (2006.01)
*B01F 13/00* (2006.01)
*B01F 15/00* (2006.01)
*B65D 47/08* (2006.01)

(52) U.S. Cl.
CPC .......... *A47J 43/27* (2013.01); *B01F 13/0022* (2013.01); *B01F 15/00512* (2013.01); *B65D 47/0885* (2013.01)

(58) Field of Classification Search
CPC ....................................... A47J 43/27

USPC .......................................... 220/568; 366/130
See application file for complete search history.

(56) References Cited

U.S. PATENT DOCUMENTS

| 1,201,284 | A | * | 10/1916 | Gilchrist | A47J 43/27 |
| | | | | | 241/282.2 |
| 3,820,692 | A | | 6/1974 | Swett et al. | |
| 4,916,672 | A | * | 4/1990 | McCrory | B01F 7/00583 |
| | | | | | 366/130 |
| 5,547,275 | A | | 8/1996 | Lillelund et al. | |
| 6,379,032 | B1 | | 4/2002 | Sorensen | |
| 7,441,941 | B2 | | 10/2008 | Vernon | |
| 7,571,830 | B2 | | 8/2009 | Lin | |
| D626,837 | S | | 11/2010 | Meyers et al. | |
| D626,838 | S | | 11/2010 | Meyers et al. | |
| D639,661 | S | | 6/2011 | Llerena | |
| D639,663 | S | | 6/2011 | Llerena | |
| D646,919 | S | | 10/2011 | Nilsson | |
| D656,357 | S | | 3/2012 | Enghard | |

(Continued)

FOREIGN PATENT DOCUMENTS

| CA | 2828351 A1 | 3/2014 |
| WO | 2017106201 A1 | 6/2017 |

(Continued)

*Primary Examiner* — David L Sorkin
(74) *Attorney, Agent, or Firm* — Dickinson Wright, PLLC; Michael E. Noe, Jr.

(57) ABSTRACT

A beverage container has a body with an open top, an interior volume and a closed bottom. A lid assembly is removably coupled to the open top of the body. A storage compartment is removably coupled to the closed bottom of the body. A mixer is coupled to the lid assembly. The mixer can mix contents located inside the body. The mixer can be silent when a user of the beverage container shakes contents located inside the body.

18 Claims, 5 Drawing Sheets

(56) References Cited

U.S. PATENT DOCUMENTS

| | | |
|---|---|---|
| D666,047 S | 8/2012 | Lin |
| D677,121 S | 3/2013 | Meyers et al. |
| D686,885 S | 7/2013 | Meyers et al. |
| D686,886 S | 7/2013 | Meyers et al. |
| D686,887 S | 7/2013 | Meyers et al. |
| D686,888 S | 7/2013 | Meyers et al. |
| 8,544,674 B2 | 10/2013 | Nilsson |
| D696,079 S | 12/2013 | Meyers et al. |
| D696,551 S | 12/2013 | Meyers et al. |
| D697,798 S | 1/2014 | Sorensen et al. |
| 8,695,830 B2 | 4/2014 | Meyers et al. |
| 8,833,586 B2 | 9/2014 | Meyers et al. |
| 8,844,746 B2 | 9/2014 | Meyers et al. |
| 8,939,305 B2 | 1/2015 | Meyers et al. |
| D727,097 S | 4/2015 | Sorensen et al. |
| D732,339 S | 6/2015 | Sorensen et al. |
| D733,497 S | 7/2015 | Sorensen et al. |
| D739,674 S | 9/2015 | Bergstrom |
| 9,120,598 B2 | 9/2015 | Meyers et al. |
| 9,120,599 B2 | 9/2015 | Shamoon et al. |
| D745,827 S | 12/2015 | Sorensen et al. |
| 9,216,843 B2 | 12/2015 | Sorensen et al. |
| D748,430 S | 2/2016 | Sorensen et al. |
| D748,478 S | 2/2016 | Sorensen et al. |
| 9,427,112 B2 | 8/2016 | Aliberti et al. |
| 9,492,024 B2 | 11/2016 | Sorensen et al. |
| 9,549,633 B2 | 1/2017 | Ng et al. |
| D820,038 S | 6/2018 | Sorensen et al. |
| D830,119 S | 10/2018 | Sorensen et al. |
| 10,279,965 B2 | 5/2019 | Enghard |
| 2006/0250887 A1* | 11/2006 | Vernon ............... B01F 11/0082 366/130 |
| 2009/0301990 A1 | 12/2009 | Cresswell et al. |
| 2011/0220674 A1 | 9/2011 | Honeyghan |
| 2012/0285843 A1 | 11/2012 | Devlin |
| 2013/0126369 A1* | 5/2013 | Gamelli ................. B65D 43/02 206/217 |
| 2013/0201783 A1* | 8/2013 | Stewart ............... B01F 11/0082 366/130 |
| 2013/0279287 A1 | 10/2013 | Cerasani |
| 2014/0119154 A1* | 5/2014 | Kershaw ................... B01F 3/08 366/130 |
| 2015/0201773 A1 | 7/2015 | Sorensen et al. |
| 2015/0201774 A1 | 7/2015 | Sorensen et al. |
| 2015/0201775 A1 | 7/2015 | Sorensen et al. |
| 2015/0250349 A1 | 9/2015 | Ng et al. |
| 2015/0353259 A1 | 12/2015 | Burden |
| 2017/0283132 A1 | 10/2017 | Sorensen et al. |
| 2018/0237191 A1 | 8/2018 | Sorensen et al. |

FOREIGN PATENT DOCUMENTS

| | | |
|---|---|---|
| WO | 2017146625 A1 | 8/2017 |
| WO | 2017189767 A1 | 11/2017 |

* cited by examiner

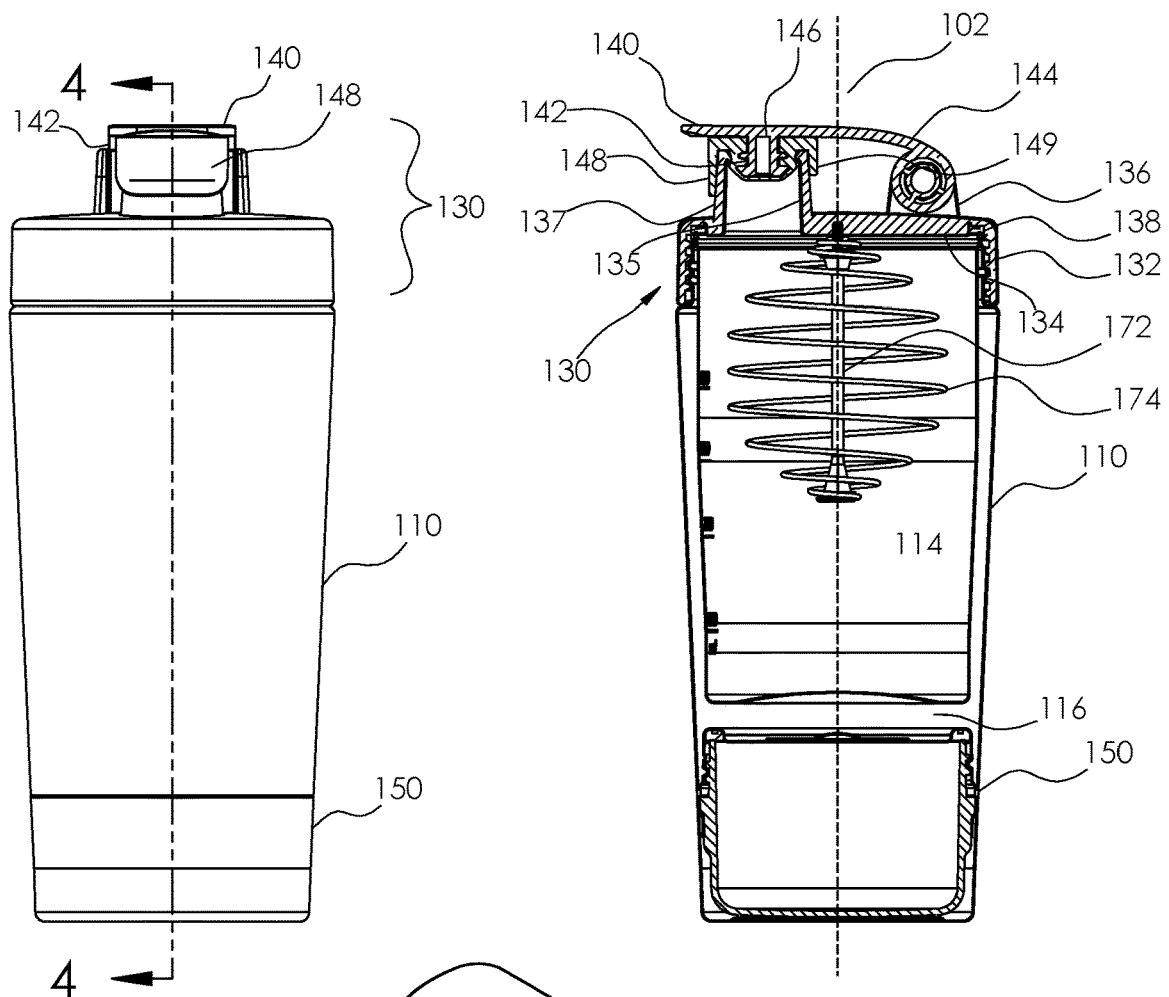
FIG. 3
FIG. 4
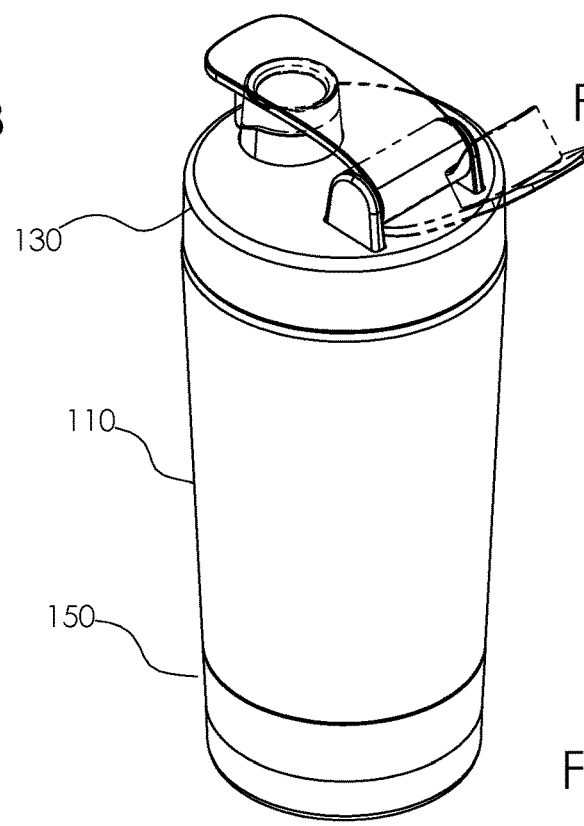
FIG. 5

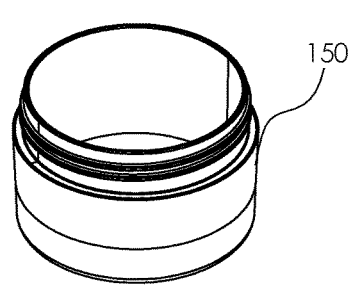
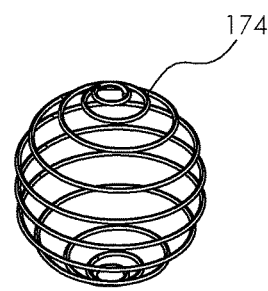
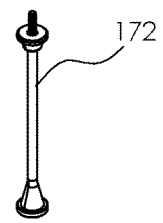
FIG. 7    FIG. 8    FIG. 9
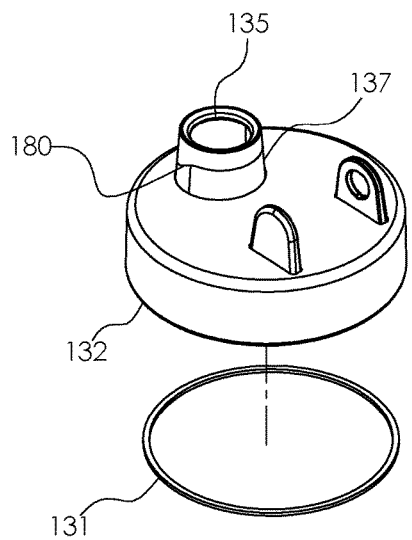
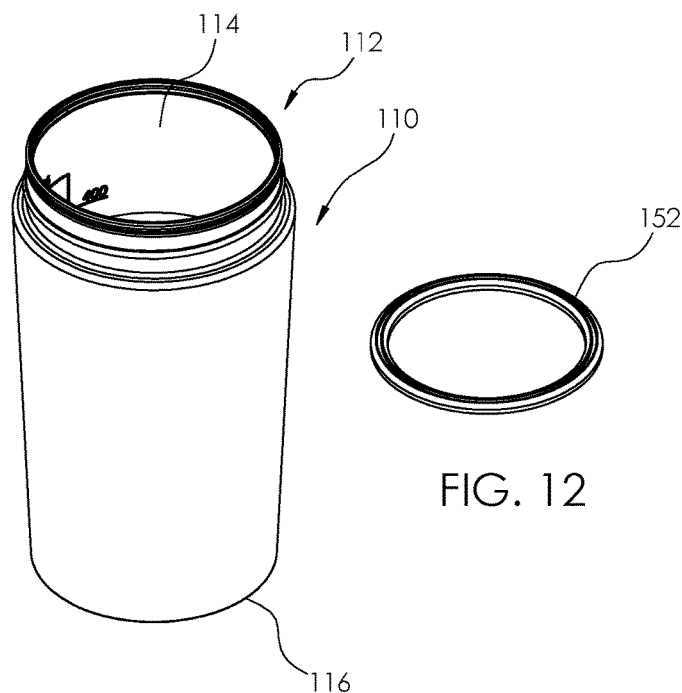
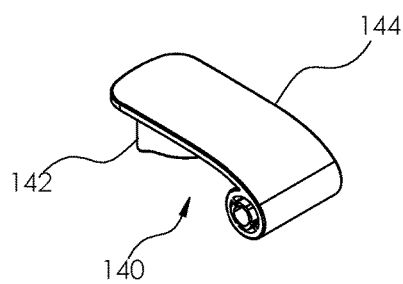
FIG. 10    FIG. 11    FIG. 12
FIG. 13

SYSTEM, METHOD AND APPARATUS FOR SHAKER BOTTLE

CROSS-REFERENCE TO RELATED APPLICATION

This application claims priority to and the benefit of U.S. Prov. App. No. 62/890,332, filed Aug. 22, 2019, which is incorporated herein by reference in its entirety.

TECHNICAL FIELD

This disclosure relates in general to containers and, in particular, to a system, method and apparatus for a protein shaker bottle.

BACKGROUND

Conventional protein shaker bottles include an agitator to mix powder and liquid inside a container. There are several drawbacks to existing designs. One disadvantage is that liquid residue can decompose on the plastic mixing components and leave behind a foul odor. The odor is difficult to remove from any plastic component, even after being washed. It may be impossible to remove such odors if the mixture was left in contact with the plastic for an extended duration of time. Another is that previous designs, such Designs such as those disclosed in U.S. Pat. No. 6,379,032 and publication US20060250887 use a mixing element that repeatedly contacts the walls of the container or guide rod. The contact between the components is noisy, which is another disadvantage. This is true when the container contains liquid, but it is especially the case when the container is empty and the mixing element is free to rattle around inside the container. Accordingly, improvements in protein shaker bottles continue to be of interest.

SUMMARY

Embodiments of a beverage container can include a body having an open top, an interior volume and a closed bottom. A lid assembly can be removably coupled to the open top of the body. A storage compartment can be removably coupled to the closed bottom of the body. A mixer can be coupled to the lid assembly. The mixer can mix contents located inside the body. The mixer can be silent when a user of the beverage container shakes contents located inside the body.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments that are illustrated in the appended drawings. However, the drawings illustrate only some embodiments and are not to be considered limiting in scope since there can be other equally effective embodiments.

It shall be noted that some of the details and/or features shown in the drawings herein may not be drawn to scale for clarity purposes.

FIG. 3 is a front view of an embodiment of the container.

FIG. 4 is a sectional side view of an embodiment of the container, taken along the line 4-4 of FIG. 3.

FIG. 5 is an isometric view an embodiment of the container showing examples of indexed positions of the cap.

FIG. 7 is an isometric view of an embodiment of a storage compartment of the container.

FIG. 8 is an isometric view of an embodiment of an agitator of the container.

FIG. 9 is an isometric view of an embodiment of a stem of the container.

FIG. 10 is an isometric view of an embodiment of a lid of the container.

FIG. 11 is an isometric view of an embodiment of a body of the container.

FIG. 12 is an isometric view of an embodiment of a seal of the container.

FIG. 13 is an isometric view of an embodiment of a cap of the container.

The use of the same reference symbols in different drawings indicates similar or identical items.

DETAILED DESCRIPTION

Figure 6:
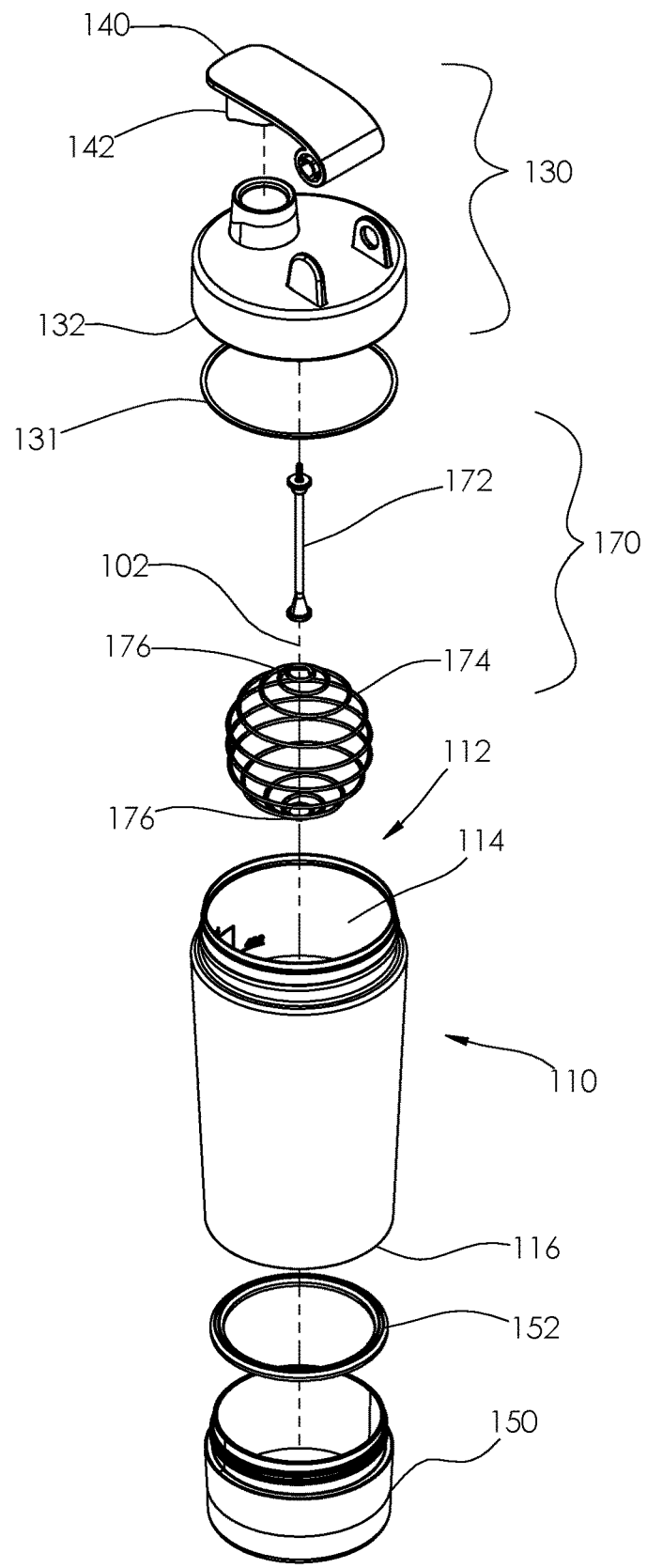
FIG. 6 is an exploded view of an embodiment of the container.

Embodiments of a system, method and apparatus for a beverage container are disclosed in FIGS. 1-14. For example, a beverage container 100 can have an axis 102 (FIGS. 4 and 6) and include a body 110 having an open top 112, an interior volume 114 and a closed bottom 116. As shown in FIG. 4, the body 110 can be double-walled and vacuum insulated.

Versions of the beverage container 100 can further include a lid assembly 130 that can be removably coupled (e.g., threaded) to the open top 112 of the body 110. A seal 131 (FIG. 6), such as a silicone ring, can be included to seal between the body 110 and the lid assembly 130. This design can help avoid contact of any plastic components with the contents of the beverage container 100.

Some examples of the beverage container 100 can include a storage compartment 150 that can be removably coupled (e.g., threaded) to the closed bottom 116 of the body 110. A seal 152, such as a silicone ring, can be included to seal between the body 110 and the storage compartment 150.

Embodiments of the beverage container also can include a mixer or shaker assembly 170. The shaker assembly 170 can be coupled (e.g., threaded) to only to an interior of the lid assembly 130, for example. The shaker assembly 170 can be configured to mix contents located inside the body 110. The shaker assembly 170 can be configured to be silent when a user of the beverage container 100 shakes contents located inside the body 110.

In some versions, the interior wall of the body 110, an interior of the lid assembly 130 and the shaker assembly 170 can consist of 100% stainless steel. In some embodiments, the interior wall of the body 110, the lid assembly 130 and the shaker assembly 170 are the only components of the beverage container 100 configured to make contact with the contents of the body 110.

Examples of the shaker assembly 170 can comprise a stem 172 that can be removably cantilevered (e.g., threadingly coupled) to the interior of the lid assembly 130. In addition, the shaker assembly 170 can include an agitator or frame 174, such as a hollow elastic agitator, mounted to the stem 172. The frame 174 can be stationary, immobilized and can have a limited range of silent oscillation within the beverage container 100. A version of the stem 172 can be cantilevered exclusively from the lid assembly 130. The stem 172 can be coaxial with the interior volume of the body 110. The frame 174 can have two axial ends 176 that are coupled to the stem 172, such that the frame 174 is in compression and does not slide on the stem 172. In one version, the frame 174 can be a concentric spring coil that is generally spherical in shape. In another version, the frame can be a variable diameter convex barrel compression spring. Embodiments of the frame 174 can have only a top and a bottom (e.g., the axial ends 176) that engage the stem 172, such that no other portion of the frame 174 makes radial or lateral contact with the stem 172 and body 110.

Embodiments of the lid assembly 130 can include a lid body 132 and a cap 140 pivotally mounted to the lid body 132. The cap 140 can have a seal and spout shield 142, such as one consisting of 100% silicone. The seal and spout shield 142 can be a single, unitary monolithic component, or comprise more than one component. When the cap 140 is in a closed position (see FIGS. 1 and 4), the seal and spout shield 142 can be configured to make contact with the contents of the body 110.

Figure 14:
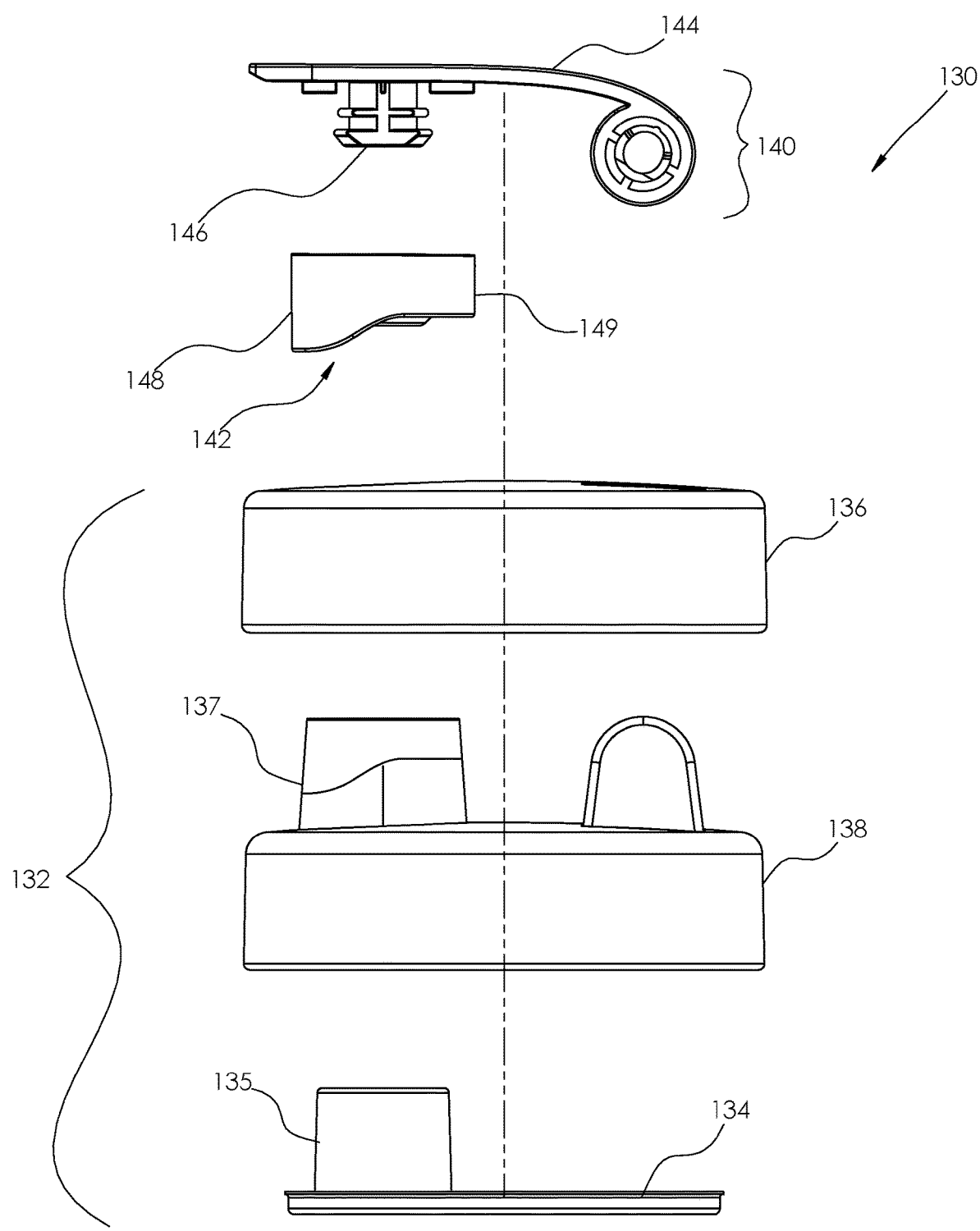
FIG. 14 is an exploded side view of an embodiment of a lid assembly of the container.

In some versions, the interior of the lid body 132 can include an interior metallic layer 134 (FIGS. 4, 10 and 14). The lid body 132 also can include an exterior metallic shell 136 and a middle plastic layer 138. Examples of the interior metallic layer 134 and middle plastic layer 138 can include nesting male spouts 135, 137, respectively, that protrude to sealingly engage the seal and spout shield 142. In the closed position, the seal and spout shield 142 can extend far enough down into the nested male spouts 135, 137 to ensure sealing with male spout 135 of interior metallic layer 134, thereby avoiding exposure of the contents of the body 110 to the male spout 137 of the middle plastic layer 138.

In addition, the lid assembly 130 can include indexed positions (FIG. 4) for retaining locations of the cap 140 relative to the lid body 132. For example, the indexed positions can include about 0 degrees in the closed position (FIG. 1) and about 150 degrees (FIG. 4, phantom lines) in an open position.

Figure 1:
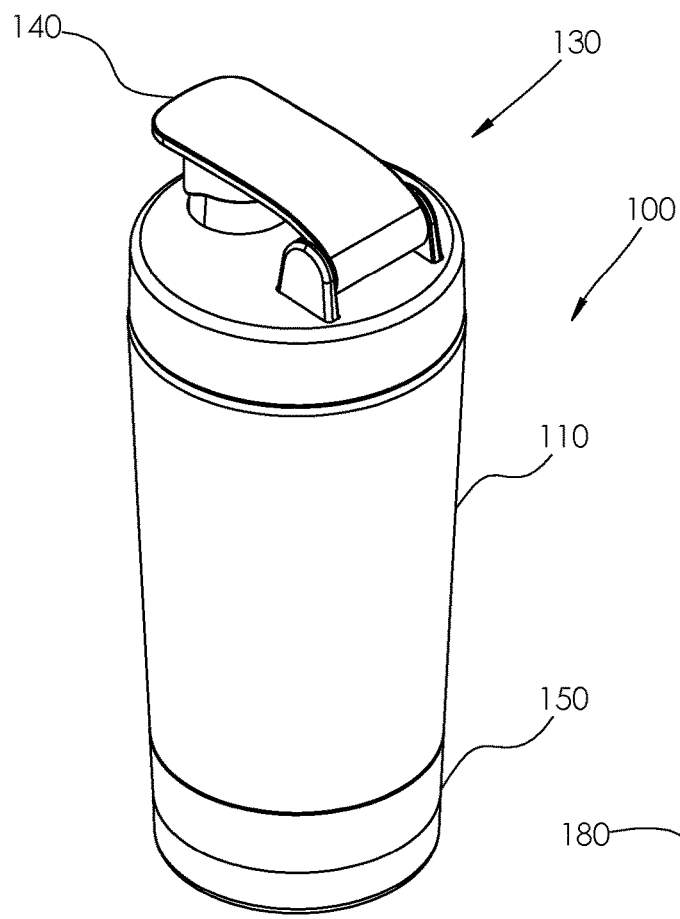
FIG. 1 is an isometric view of an embodiment of a container with the cap in a closed position.
Figure 2:
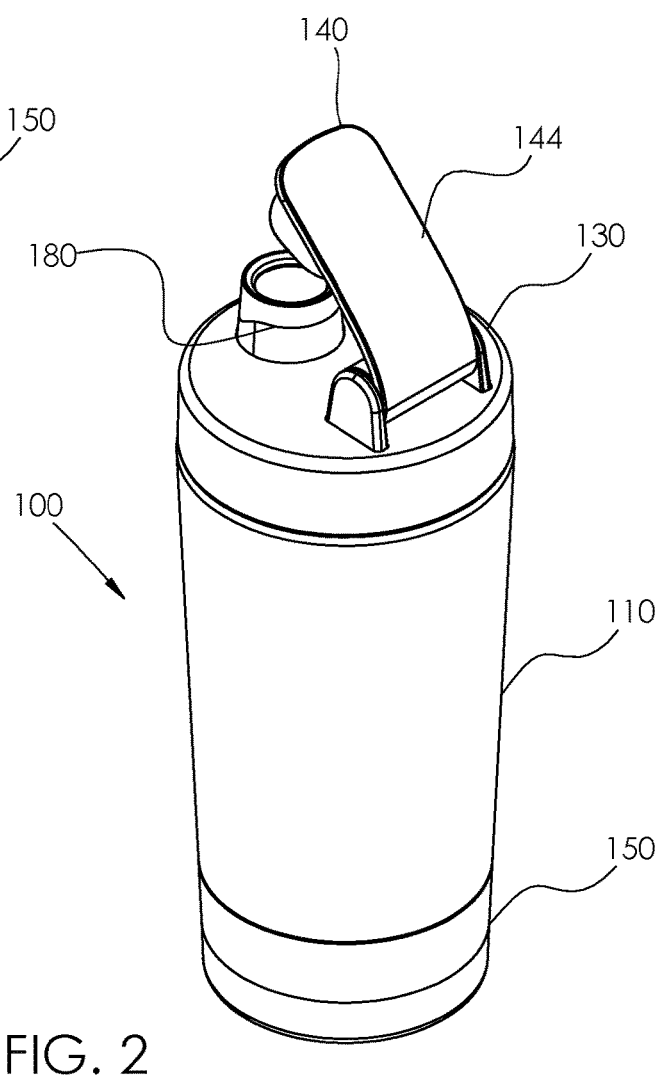
FIG. 2 is an isometric view of an embodiment of the container with the cap in an open position.

Embodiments of the beverage container 100 can further include the lid body 132 with a visual indicator 180. See FIGS. 2 and 10. The visual indicator 180 can be external and visible when the cap 140 is not closed. However, the visual indicator 180 can be not visible when the cap 140 is in the closed position (FIGS. 1 and 3). The visual indicator 180 can be located on the middle plastic layer 138. Examples of the visual indicator 180 can include a groove, rim, symbol or texture change or other differentiation.

Versions of the cap 140 can include a panel 144 that is generally rectangular in top view (FIG. 13) and arcuate in side view (FIG. 14). The panel 144 can extend an entire length of the cap 140.

The panel 144 can include no blind hole or indentation in its top surface. It can be a curved panel 144. The seal and spout shield 142 can be removably mounted to an exterior of a male plug 146 extending from an underside of the panel 144. Examples of the panel 144 can be both wider and longer than the seal and spout shield 142, as shown in FIGS. 3 and 4, respectively. As shown in FIGS. 4 and 14, a front 148 of the seal and spout shield 142 is axially longer than a rear 149 of the seal and spout shield 142. In this example, the front 148 can obscure the visual indicator 180 from view when the cap 140 is in the closed position.

Other embodiments can include an agitator for use in a shaker. In an example, the agitator can comprise a tetrahedral body having four planar faces, four vertices, and six edges, with each edge extending between each of the vertices. Each vertex can be rounded off and configured to forcibly contact the container wall and an entirety of the bottom upon shaking the vessel. These rounded vertices can form a propeller-like spinning and tumbling motion through the liquid-powder mixture when the vessel is vigorously shaken up and down, and scalloped edges of the agitator can produce additional turbulence to efficiently blend a liquid/powder mixture.

The present invention relates to apparatus and methods for improved mixing of powder and liquid mixtures through the use of flow-through agitator apparatus. The embodiments can comprise a wire-frame object with interstitial spaces which allow flow of liquids and powders into and out of the interior of the wire-frame object.

Some embodiments further comprise an interior agitator placed within the wire-frame object which may be a solid shape or another wire-frame object.

In one version, a metal wire can be wrapped around a metal stem in a spherical pattern and with the wire being physically compressed when attached to the underside of the lid. A solution is a mixing element comprising metallic materials that will not absorb smell and a mixer which, when left in an empty bottle, is not noisy regardless of movement of the bottle.

In one embodiment, the stainless steel components can comprise 18% chromium and 8% nickel. The attachable storage compartment can be used to store protein, supplements, snacks, etc. The silent shaker system offers no rattling on the stem. For positive seal lock confirmation (via, e.g., vertical alignment), the visual indicator line can "disappear" (it is obstructed from view) when the lid is sufficiently closed. The container can be leak proof and include an easy open flip cap. The cap can be lock-step indexed so it does not flop around when it is open or closed.

Other embodiments can include an agitator with a coil pitch, which is the distance between adjacent coils. The coils can be formed from a wire that has a wire diameter. For example, the coil pitch can be in a range from about the wire diameter (e.g., about 1 mm to about 2 mm) to about 50 mm. The agitator can include one or more coils, such as 3 coils. When viewed along its rotational axis, the agitator can have an outer diameter. The outer diameter of the agitator can be about 7 mm to about 76 mm, in some versions. The agitator also can have a free length which is the natural axial length of the agitator when it is not compressed or in tension. For example, the free length can be about 40 mm to about 130 mm.

Other embodiments can include one or more of the following items.
1. A beverage container, comprising:
    a body having an open top, an interior volume and a closed bottom;
    a lid assembly removably coupled to the open top of the body;
    a mixer coupled only to an interior of the lid assembly, wherein the mixer is configured to mix contents located inside the body, and the mixer is configured to be silent when a user of the beverage container shakes contents located inside the body;

an interior of the body, an interior of the lid assembly and the mixer consist of 100% stainless steel; and the interior of the body, the lid assembly and the mixer are the only components of the beverage container configured to make contact with the contents of the body.

2. The beverage container, wherein the mixer comprises a stem that is removably cantilevered from the interior of the lid assembly, a frame comprising a hollow elastic agitator mounted to the stem, and the beverage container further comprises a storage compartment removably coupled to the closed bottom of the body.

3. The beverage container, wherein the frame is stationary, immobilized and has a limited range of silent oscillation, and the body is double-walled and vacuum insulated.

4. The beverage container, wherein the stem is cantilevered exclusively from the lid assembly, the stem is coaxial with the interior volume of the body, and the frame has two axial ends that are coupled to the stem, such that the frame is in compression and does not slide on the stem.

5. The beverage container, wherein the frame comprises a concentric spring coil that is generally spherical in shape.

6. The beverage container, wherein the frame comprises a variable diameter convex barrel compression spring.

7. The beverage container, wherein only a top and a bottom of the frame engage the stem, such that no other portion of the frame makes radial or lateral contact with the stem and body.

8. The beverage container, wherein the lid assembly comprises a lid body and a cap pivotally mounted to the lid body, the cap has a seal and spout shield consisting of 100% food grade silicone and, when the cap is in a closed position, the seal and spout shield is configured to make contact with the contents of the body.

9. The beverage container, wherein the interior of the lid body comprises an interior metallic layer, the lid body also comprises an exterior metallic shell and a middle plastic layer, the interior metallic layer and middle plastic layer comprise nesting male spouts that protrude to sealingly engage the seal and spout shield.

10. The beverage container, wherein the lid assembly comprises indexed positions for retaining locations of the cap relative to the lid body.

11. The beverage container, wherein the indexed positions include about 0 degrees in the closed position and about 150 degrees in an open position.

12. The beverage container, wherein the lid body comprises a visual indicator that is external and visible when the cap is not closed, and the visual indicator is not visible when the cap is in the closed position.

13. The beverage container, wherein the cap comprises a panel that is generally rectangular in top view and arcuate in side view, the panel extends an entire length of the cap, the seal and spout shield is removably mounted to an exterior of a male plug extending from an underside of the panel, and the panel is wider and longer than the seal and spout shield;

the middle plastic layer comprises the visual indicator; and a front of the seal and spout shield is axially longer than a rear of the seal and spout shield, such that the front obscures the visual indicator from view when the cap is in the closed position.

14. A beverage container, comprising:

a body having an open top, an interior volume and a closed bottom;

a lid assembly removably coupled to the open top of the body;

a storage compartment removably coupled to the closed bottom of the body;

a mixer coupled only to an interior of the lid assembly, wherein the mixer is configured to mix contents located inside the body, and the mixer is configured to be silent when a user of the beverage container shakes contents located inside the body; and the mixer comprises a stem that is removably cantilevered from the interior of the lid assembly, and a frame comprising a hollow elastic agitator mounted to the stem, and the frame is stationary, immobilized and has a limited range of silent oscillation.

15. The beverage container, wherein:

the stem is cantilevered exclusively from the lid assembly, and the stem is coaxial with the interior volume of the body;

the frame has two axial ends that are coupled to the stem, such that the frame is in compression and does not slide on the stem;

the frame comprises a variable diameter convex barrel compression spring; and only a top and a bottom of the frame engage the stem, such that no other portion of the frame makes radial or lateral contact with the stem and body.

16. The beverage container, wherein the lid assembly comprises a lid body and a cap pivotally mounted to the lid body, the cap has a seal and spout shield consisting of 100% food grade silicone and, when the cap is in a closed position, the seal and spout shield is configured to make contact with the contents of the body.

17. The beverage container, wherein the interior of the lid body comprises an interior metallic layer, the lid body also comprises an exterior metallic shell and a middle plastic layer, the interior metallic layer and middle plastic layer comprise nesting male spouts that protrude to sealingly engage the seal and spout shield.

18. The beverage container, wherein the lid assembly comprises indexed positions for retaining locations of the cap relative to the lid body, and the indexed positions include about 0 degrees in the closed position and about 150 degrees in an open position.

19. A beverage container, comprising:

a body having an open top, an interior volume and a closed bottom;

a lid assembly removably coupled to the open top of the body;

a storage compartment removably coupled to the closed bottom of the body;

a mixer coupled only to an interior of the lid assembly, wherein the mixer is configured to mix contents located inside the body, and the mixer is configured to be silent when a user of the beverage container shakes contents located inside the body; and the lid body comprises a visual indicator that is external and visible when the cap is not closed, and the visual indicator is not visible when the cap is in the closed position.

20. The beverage container, wherein the cap comprises a panel that is generally rectangular in top view and arcuate in side view, the panel extends an entire length of the cap, the seal and spout shield is removably mounted to an exterior of a male plug extending from an underside of the panel, and the panel is wider and longer than the seal and spout shield;

the middle plastic layer comprises the visual indicator; and a front of the seal and spout shield is axially longer than a rear of the seal and spout shield, such that the front obscures the visual indicator from view when the cap is in the closed position.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. A beverage container, comprising:
   a body having an open top, an interior volume and a closed bottom;
   a lid assembly removably coupled to the open top of the body;
   a mixer coupled only to an interior of the lid assembly, wherein the mixer is configured to mix contents located inside the body, the mixer is configured to be silent when a user of the beverage container shakes contents located inside the body, the mixer comprises a stem that is removably cantilevered exclusively from an interior the lid assembly, the stem is coaxial with the interior volume of the body, and a frame that is elastic and has two axial ends coupled to the stem, such that the frame is in compression and does not slide on the stem;
   an interior of the body, an interior of the lid assembly and the mixer consist of a metallic material; and
   the interior of the body, the lid assembly and the mixer are the only components of the beverage container configured to make contact with the contents of the body.

2. The beverage container of claim 1, wherein the frame is formed from round wire and comprises a hollow agitator mounted to the stem, and the beverage container further comprises a storage compartment removably coupled to the closed bottom of the body.

3. The beverage container of claim 1, wherein the frame has a limited range of silent oscillation, and the body is double-walled and vacuum insulated.

4. The beverage container of claim 1, wherein the frame comprises a concentric spring coil that is generally spherical in shape.

5. The beverage container of claim 1, wherein the frame comprises a variable diameter convex barrel compression spring.

6. The beverage container of claim 1, wherein only a top and a bottom of the frame engage the stem, such that no other portion of the frame makes radial or lateral contact with the stem and body.

7. The beverage container of claim 1, wherein the lid assembly comprises a lid body and a cap pivotally mounted to the lid body, the cap has a seal and spout shield consisting of silicone and, when the cap is in a closed position, the seal and spout shield is configured to make contact with the contents of the body.

8. The beverage container of claim 7, wherein the interior of the lid body comprises an interior metallic layer, the lid body also comprises an exterior metallic shell and a middle plastic layer, the interior metallic layer and middle plastic layer comprise nesting male spouts that protrude to sealingly engage the seal and spout shield.

9. The beverage container of claim 7, wherein the lid assembly comprises indexed positions for retaining locations of the cap relative to the lid body.

10. The beverage container of claim 9, wherein the indexed positions include about 0 degrees in the closed position and about 150 degrees in an open position.

11. The beverage container of claim 8, wherein the lid body comprises a visual indicator that is external and visible when the cap is not closed, and the visual indicator is not visible when the cap is in the closed position.

12. The beverage container of claim 11, wherein the cap comprises a panel that is generally rectangular in top view and arcuate in side view, the panel extends an entire length of the cap, the seal and spout shield is removably mounted to an exterior of a male plug extending from an underside of the panel, and the panel is wider and longer than the seal and spout shield;
    the middle plastic layer comprises the visual indicator; and
    a front of the seal and spout shield is axially longer than a rear of the seal and spout shield, such that the front obscures the visual indicator from view when the cap is in the closed position.

13. A beverage container, comprising:
    a body having an open top, an interior volume and a closed bottom;
    a lid assembly removably coupled to the open top of the body, the lid assembly comprises a lid body and a cap pivotally mounted to the lid body, the lid body comprises an interior metallic layer, an exterior metallic shell and a middle plastic layer, the interior metallic layer and middle plastic layer comprise nesting male spouts that protrude;
    a storage compartment removably coupled to the closed bottom of the body;
    a mixer coupled only to an interior of the lid assembly, wherein the mixer is configured to mix contents located inside the body, the mixer comprises a frame that is a variable diameter convex barrel compression spring, and the mixer is configured to be silent when a user of the beverage container shakes contents located inside the body; and
    the mixer comprises a stem that is removably cantilevered from the interior of the lid assembly, and a frame comprising a hollow elastic agitator mounted to the stem, and the frame has a limited range of silent oscillation.

14. The beverage container of claim 13, wherein:
    the stem is cantilevered exclusively from the lid assembly, and the stem is coaxial with the interior volume of the body;
    the frame has two axial ends that are coupled to the stem, such that the frame is in compression and does not slide on the stem; and
    only a top and a bottom of the frame engage the stem, such that no other portion of the frame makes radial or lateral contact with the stem and body.

15. The beverage container of claim 13, wherein the cap has a seal and spout shield consisting of silicone and, when the cap is in a closed position, the seal and spout shield is configured to make contact with the contents of the body.

16. The beverage container of claim 15, wherein the nesting male spouts protrude to sealingly engage the seal and spout shield.

17. The beverage container of claim 15, wherein the lid assembly comprises indexed positions for retaining locations of the cap relative to the lid body, and the indexed positions include about 0 degrees in the closed position and about 150 degrees in an open position.

18. A beverage container, comprising:
    a body having an open top, an interior volume and a closed bottom;
    a lid assembly removably coupled to the open top of the body and having a cap that is pivotable relative to the lid assembly, and the cap comprises a seal and spout shield;
    a storage compartment removably coupled to the closed bottom of the body;

a mixer coupled only to an interior of the lid assembly, wherein the mixer is configured to mix contents located inside the body, and the mixer is configured to be silent when a user of the beverage container shakes contents located inside the body;

the lid assembly comprises a visual indicator that is external and visible when the cap is not closed, and the visual indicator is not visible when the cap is in the closed position;

wherein the cap comprises a panel that is generally rectangular in top view and arcuate in side view, the panel extends an entire length of the cap, the seal and spout shield is removably mounted to an exterior of a male plug extending from an underside of the panel, and the panel is wider and longer than the seal and spout shield;

a middle plastic layer of the lid assembly comprises the visual indicator; and a front of the seal and spout shield is axially longer than a rear of the seal and spout shield, such that the front obscures the visual indicator from view when the cap is in the closed position.

\* \* \* \* \*

UNITED STATES PATENT AND TRADEMARK OFFICE
CERTIFICATE OF CORRECTION

PATENT NO. : 11,103,108 B2
APPLICATION NO. : 16/996274
DATED : August 18, 2020
INVENTOR(S) : Jacob Mager et al.

Page 1 of 1

It is certified that error appears in the above-identified patent and that said Letters Patent is hereby corrected as shown below:

In the Specification

In Column 1 Line 28 delete "another is the previous designs, such".

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*